United States Patent [19]
Hartmann

[11] 3,798,668
[45] Mar. 19, 1974

[54] CAMERA LIGHT
[75] Inventor: Rudolf Hartmann, Skokie, Ill.
[73] Assignee: Bell & Howell Company, Chicago, Ill.
[22] Filed: Oct. 5, 1972
[21] Appl. No.: 295,381

[52] U.S. Cl. ................ 354/149, 240/1.3, 240/44.2, 352/139, 352/198
[51] Int. Cl. .......................................... G03b 17/56
[58] Field of Search ............ 240/1.3, 2 C, 20, 44.1, 240/44.2; 95/11 L, 11 R, 1 R; 352/139, 140, 198

[56] References Cited
UNITED STATES PATENTS
| | | | |
|---|---|---|---|
| 3,369,467 | 2/1968 | Land | 95/11 L |
| 3,280,320 | 10/1966 | Beaton et al. | 240/1.3 |
| 3,296,947 | 1/1967 | Engelsmann et al. | 95/1 R |

*Primary Examiner*—Fred L. Braun
*Attorney, Agent, or Firm*—Roger M. Fitz-Gerald; John E. Peele, Jr.; William K. Serp

[57] ABSTRACT

A light for a camera having an adjustable focal length or "zoom" lens. The lens carries a cam surface upon which a cam follower rides. The follower is coupled to a link assembly which supports a light source in the form of a lamp positioned adjacent a reflector. As the focal length of the lens is varied, the follower rides upon the cam transmitting movement to the link assembly. The link assembly in turn shifts the position of the lamp with respect to the reflector. In this manner, the beam width of the camera light is automatically varied to correspond with the field of view of the "zoom" lens.

9 Claims, 1 Drawing Figure

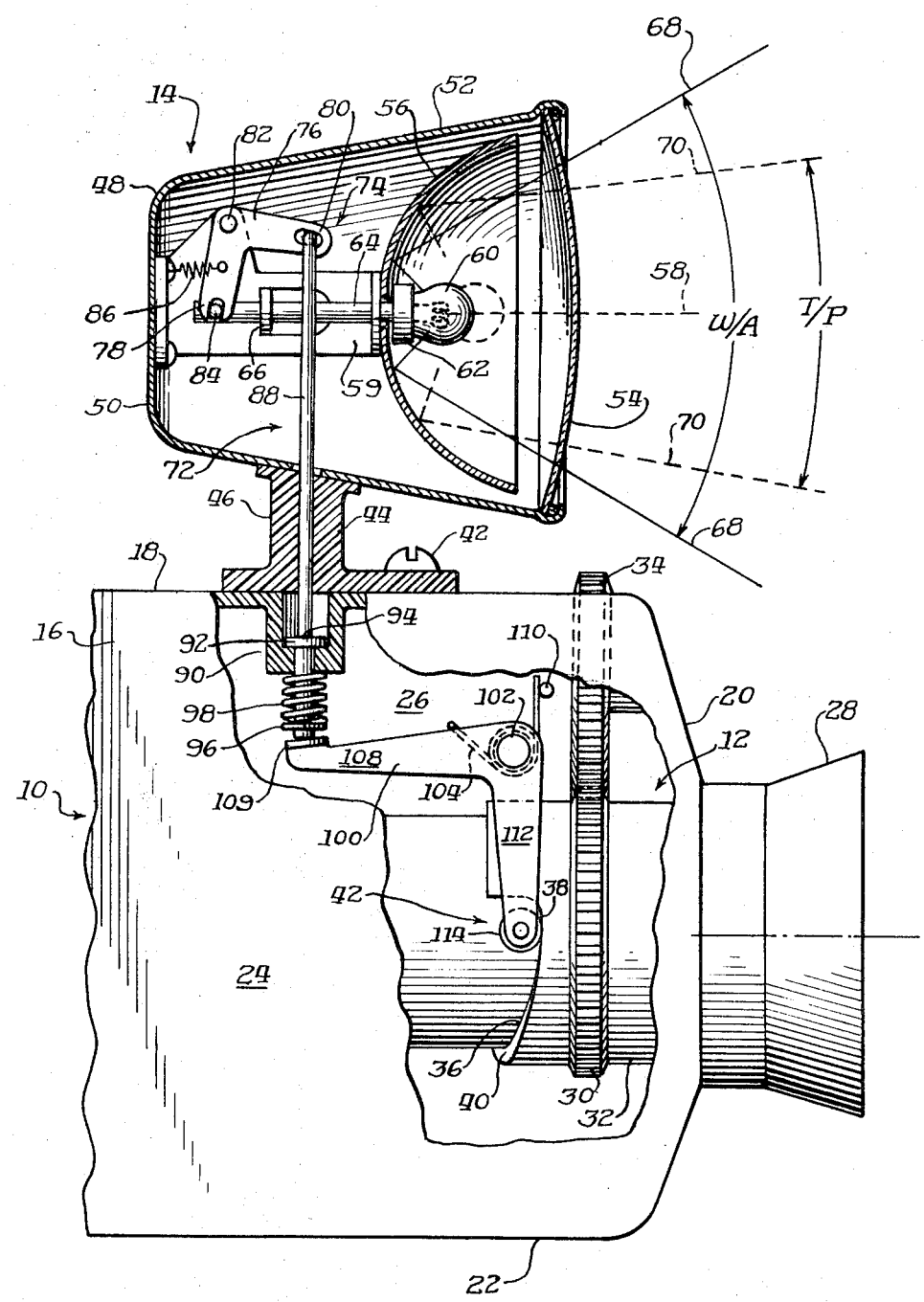

CAMERA LIGHT

BACKGROUND OF THE INVENTION

This invention generally relates to a light for a camera and more particularly relates to a light for a camera having an adjustable focal length or "zoom" lens wherein the light automatically provides a field of illumination corresponding to the focal length of the "zoom" lens.

Presently available motion picture cameras such as super 8mm cameras available for home use frequently include a "zoom" lens. "Zoom" lenses provide a lens system with a manually adjustable focal length to facilitate composition of the subject matter without the necessity of altering the camera to subject distance. It will be appreciated that the field of view of a "zoom" lens varies greatly between the wide angle (W/A) and telephoto (T/P) setting of the lens. When such cameras are used to photograph scenes illuminated with available light, the scenes are generally evenly lit allowing the full range of the lens to be used without compensating for changes in light level. Scenes illuminated with a movie light present quite a different problem.

Present movie lights generally include a lamp mounted in relation to a parabolic reflector which reflects the light from the lamp over a restricted field. It will be appreciated that with the "zoom" lens in its wide angle position, the field to be illuminated is considerably greater than when the lens is at its telephoto setting. In the past, this problem, in some instances, has been overcome by positioning the lamp during manufacture with respect to the reflector so that a wide field is illuminated corresponding to the wide angle setting of the lens. Such a lamp to reflector setting, while accommodating both the wide angle and telephoto extremes of the "zoom" lens, is particularly inefficient at the telephoto lens settings. The field covered by the movie light is excessively large at the sacrifice of distance. In this instance, the light from the lamp is spread over a field which is greater than necessary rather than being concentrated in a narrow field to produce adequate light at a maximum distance from the camera as desired for telephoto filming.

To provide a field of illumination more nearly corresponding with that of the lens setting, some movie lights are provided with an adjustment means which varies the physical distance between the lamp and the reflector. In such arrangements, the reflector is usually fixed in the light housing and the lamp is mounted upon a sliding support lever which passes through the reflector and the housing to the outside of the housing. Thus, as the lamp is manually positioned along the primary axis of the reflector, the field of illumination is varied to correspond with the field of view of the lens system. A particular difficulty with such a device is that the user must estimate the lamp setting for the selected lens position. Frequently, due to pressures of time, the user may forget to correct the setting resulting in poor illumination at edges of the lens field or a light concentration is obtained which is considerably less than optimum. Frequently, the user desires to adjust the lens during filming and the added burden of simultaneously adjusting the width of the illumination field as well as the lens setting becomes unduly cumbersome.

A main object of this invention is to provide a light with a variable field of illumination which automatically corresponds to a selected focal length of a variable focal length lens.

Other objects and advantages of this invention will become apparent from the following description and drawing in which the single FIGURE illustrates a preferred embodiment of a light and cooperating camera including certain features of this invention. Portions of the camera and movie light are fragmentarily illustrated to more clearly show the features of the illustrated embodiment.

DESCRIPTION OF THE ILLUSTRATED EMBODIMENT

A preferred embodiment of the invention is illustrated in the accompanying drawing.

Although the illustrated embodiment is hereinafter described with respect to a motion picture camera it will be appreciated that the features of this invention may be utilized with other optical devices.

Briefly, the illustrated embodiment includes a motion picture camera 10 which is provided with an adjustable focal length or "zoom" lens 12. Mounted upon the camera 10 is a movie light 14. The movie light is mechanically coupled to the "zoom" lens 12 so that the angle of illumination of the movie light 14 is automatically adjusted to correspond with the selected focal length of the "zoom" lens 12. This feature assures that the illuminated area will be adequate for the focal length selected and will not be excessive thereby providing usuable illumination at the maximum possible distance from the camera 10.

More specifically, as illustrated, the camera 10 includes a body 16 defining an upper wall 18, a front wall 20, a bottom wall 22 and side walls 24, 26. Projecting from the front wall 20 of the camera 10 is a lens hood 28 and positioned within the lens hood 28 is the "zoom" lens 12. The construction of such a lens is well known to those skilled in the art and provides a wide angle setting (W/A) having a relatively short focal length and wide field of view as well as a telephoto (T/P) setting providing relatively long focal length and narrow field of view. The focal length of the lens 12 is adjusted by means of a gear 30 which is formed upon an outer sleeve 32 of the "zoom" lens 12 and meshes with an adjustable thumb wheel 34. Serving to facilitate adjustment of the zoom lens 12 by the user, a portion of the thumb wheel 34 protrudes through an opening in the upper wall 18 of the camera body. The inwardly disposed edge of the sleeve 32 of the zoom lens defines a camming surface 36 having a fall 38 which corresponds to a wide angle setting of the zoom lens 12 and gradually rises to a maximum point 40 which corresponds to the telephoto setting of the lens 12. The camming surface forms part of a camming means 42 which will be subsequently further described.

The movie light 14 is securely mounted upon the upper wall 18 of the camera 10 by means of a screw 42 which passes through an opening defined by a movie light housing support bracket 44. The support bracket 44 defines an upwardly projecting pedestal 46 which supports a movie light housing 48. The housing 48 defines a rear wall 50 as well as a frustro-conically shaped side wall 52. The front of the housing 48 being opened and secured thereto in a lens 54. Serving to reflect light outwardly through the lens 54 and positioned within the housing adjacent the lens is a parabolically shaped reflector 56 having a primary axis 58. The reflector 56 is supported by a reflector bracket 59 secured to the rear wall 50 of the housing 48. Movably positioned within the parabolic reflector 56 is a light source in the form of a lamp bulb 60 which is removably retained within a conventional lamp socket 62. The reflector 56 is secured by the bracket 59 in fixed relation to the lens 54. The lamp socket 62 is secured to a lamp support rod 64 which passes through the reflector 56 and bracket 59 and slidably passes through a lamp support rod bushing 66 fixed to the bracket 59. Thus, as the lamp support rod 64 is moved within the bushing 66, the lamp bulb 60 will move along the primary axis 58 of reflector 56 thereby altering its position with respect to the surface of the reflector. It will be appreciated that this movement, in accordance with accepted physical laws, results in a change in the illumination area provided by the light. In the position shown in the single FIGURE wherein the bulb 60 is closest to the reflector 56, the illuminated area covered by the light will be maximum as illustrated by the ray lines 68 which correspond to the wide angle setting of the "zoom" lens 12. In the extended position as shown in phantom, the illuminated area uncovered by the light will be relatively narrow corresponding to the telephoto position as illustrated by the ray lines 70. Thus, as the lens support rod 64 is slidably positioned within the support rod bushing 66 the illumination area of the light may be varied from a wide angle (W/A) position to a telephoto (T/P) position as well as all intermediate positions.

The lens support rod 64 is coupled to the "zoom" lens 12 by a coupling means 72 so that as the lens 12 is adjusted the field of illumination of the movie light 14 will be correspondingly adjusted. Serving to accomplish this function is a link assembly 74 which includes an L-shaped lamp support rod coupling link 76, defining a bifurcated arm 78 and a slotted arm 80. The rod coupling link 76 is pivotally supported to the bracket 59 at the elbow by means of a coupling link support pin 82. The end of the bifurcated arm 78 slidably receives a rod drive pin 84 which is secured to the rearward end of the lamp support rod 64. Positioned approximately immediate the pivot link support pin 82 and the end of the bifurcated arm 78 is a coupling link returned spring 86 one end of which is connected to the coupling link 76 and the remaining end of which is secured to the rearward end of the bracket 59 secured to the rear wall 50 of the movie light housing 48. The return spring 86 urges the coupling link 76 in a clockwise direction about the support pin 82 drawing the lamp support rod 64 towards the rearward wall 50 of the housing 48 thus forcing the lamp bulb 60 towards the reflector 56 which corresponds to the wide angle position of the "zoom" lens 12. The end of the slotted arm 80 of the lamp support rod coupling link 76 is biased downward by the spring 86 as viewed in the single FIGURE and engages a lamp drive shaft 88 which passes through the movie light housing support bracket 44. The drive shaft 88 is journalled through a circular opening defined by a guide shaft bracket 90 cast as a portion of the body 16 of the camera. Adjacent the upwardly disposed surface of the guide shaft bracket 90 and serving to limit downward movement of the lamp drive shaft 88 is a retaining collar 92 placed about a circular land 94 defined by the outer surface of the shaft. Secured to the downwardly disposed end of the lamp drive shaft which passes through the bracket 90 is a "C" washer 96 which serves to retain a compression spring 98 about the drive shaft. The compression spring 98 is seated against the lower surface of the bracket 90 and against the retaining washer thereby biasing the drive shaft 88 downwardly in cooperation with the biasing force supplied by the coupling link return spring 86.

Serving to couple the lamp drive shaft 88 to the cam 36 defined by the sleeve 32 of the "zoom" lens 12 is an L-shaped lens drive arm 100. The elbow of the lens drive arm 100 is pivotally secured to the camera body 16 by means of a support pin 102. Biasing the arm 100 in a counter-clockwise direction is a torsion spring 104 the coil of which is positioned about the support pin 102. One of the ends of the spring 102 is hooked about the upper edge of a first leg 108 of the lens drive arm 100. The remaining end of the torsion spring 104 is retained by a stop pin 110 projecting from the inner wall 26 of the camera 10. The end of the first leg 108 of the lens drive arm is formed to define a tab 109 which is positioned against the downwardly disposed end of the lamp drive shaft 88. As a result of the biasing force of the compression spring 98 and the coupling link return spring 86, the shaft 88 is maintained in surface contact with the leg 108 of the lens drive arm 100 so as to follow its movement. A second leg 112 of the lens drive arm 100 carries a drive cam follower 114 in the form of a cylindrical bearing which is caused to ride upon the cam surface 36 defined by the outer cylinder 32 of the "zoom" lens 12.

As previously mentioned, the cam surface 36 defines a fall 38 into which the follower 114, as illustrated in the FIGURE is positioned. This position corresponds to the wide angle position of the "zoom" lens. In this condition, it will be appreciated that the lens drive arm 100 is in its most counter-clockwise position, and the lamp drive shaft is downwardly disposed drawing the lamp support rod 64 to the left through the rod coupling link 88 as viewed in the single FIGURE. In the wide angle position, the lamp 60 is drawn towards the parabolic reflector 56 so as to provide a field of illumination which corresponds to that of the field of view of the "zoom" lens 12 at its wide angle setting. As the lens is rotated in the direction indicated by the arrow 116 toward its telephoto position, the cam follower 114 rides upon the cam surface 36 causing the lens drive arm 100 to rotate in a clockwise direction about the support pin 102. Such clockwise rotation forces the lamp drive shaft 88 upwardly against the compression spring 98 causing the lamp support rod coupling link 76 to rotate in a counter-clockwise direction forcing the lamp support rod 64 to the right through the rod support bushing 66. In this manner, the bulb 60 is placed in the position illustrated in phantom in the FIGURE. In the telephoto position the bulb 60 is farthest from the reflector 56 so that the light rays reflected from the reflector 56 are closer together providing a more restricted field of illumination which corresponds to the field of view of the telephoto lens. As the "zoom" lens 12 is adjusted to compose the image, the angle of illumination provided by the lamp 60 is adjusted to correspond with the field of view of the "zoom" lens 12. The operator need not constantly remind himself to check the setting of the movie light 14 since the correct setting is automatically provided.

While this invention has been particularly shown and described in connection with a preferred embodiment, it will be understood that various changes in form and detail may be made without departing from the spirit and scope of the invention set forth in the following claims.

What is claimed is:

1. In combination, a camera having a rotatably mounted lens for adjusting focal length, a camera light for illuminating the subject being photographed, said camera light including a reflector and a light source with means mounting the light source and reflector for relative movement along the axis of the light source and reflector, the improvement comprising means operatively associated with said rotatable lens and said mounting means for transmitting rotational movement of said lens to relative movement between said light source and reflector along said axis so as to vary the relative position of the light source and reflector in accordance with the focal length setting of the rotatably adjustable focal length lens.

2. In combination, a camera having a lens with an adjustable focal length, a camera light for illuminating the subject being photographed, said camera light including a reflector and a light source, means mounting the reflector and light source for relative movement so as to vary the beam width of the light from the camera light, and coupling means operatively associated with said mounting means to vary the relative positioning of the light source and reflector in accordance with the focal length setting of the adjustable focal length lens, said coupling means including camming means coupled to the adjustable lens, said camming means defining the relative positional relationship of the light source and reflector as determined by the focal length of the lens.

3. The combination of claim 2 wherein said coupling means includes a link assembly between said camming means and said mounting means.

4. The combination of claim 3 wherein said camming means includes a cam surface carried by the adjustable lens and a follower riding along said cam surface, said follower being coupled to said link assembly and serving to establish the relative position of said light source and reflector through said link assembly as determined by said cam surface.

5. The combination of claim 4 wherein said coupling means includes biasing means for biasing said link assembly against said camming means to assure that said link assembly maintains a preselected position as determined by said camming means.

6. In combination with a camera having a lens with an adjustable focal length and a camera light for illuminating the subject being photographed, said camera light including a reflector and a light source, the improvement comprising mounting said light source for movement with respect to the reflector, and including means coupling said light source to the adjustable lens to vary the position of the light source with respect to the reflector and thereby vary the beam width of the light from the camera light in accordance with the focal length setting of the adjustable focal length lens, said coupling means including a camming means coupled to the adjustable lens, said camming means defining the positional relationship of the light source with respect to the reflector as determined by the focal length of the lens.

7. The apparatus of claim 6 wherein said coupling means includes a link assembly coupled to said camming means and to the light source.

8. The apparatus of claim 7 wherein said camming means includes a cam surface carried by the adjustable lens and a follower riding along said cam surface, said follower coupled to said link assembly and serving to position said light source with respect to said reflector through said link assembly as determined by said cam surface.

9. The apparatus of claim 8 wherein said coupling means includes biasing means for biasing said link assembly against said camming means to assure that said link assembly maintains a preselected position as determined by said camming means.

* * * * *